United States Patent [19]

Paul

[11] 3,744,034

[45] July 3, 1973

[54] METHOD AND APPARATUS FOR PROVIDING A SECURITY SYSTEM FOR A COMPUTER

[75] Inventor: Gerard T. Paul, Weston, Conn.

[73] Assignee: The Perkin-Elmer Corporation, Norwalk, Conn.

[22] Filed: Jan. 27, 1972

[21] Appl. No.: 221,246

[52] U.S. Cl. .................................. 340/172.5, 444/1
[51] Int. Cl. ............................................ G06f 11/04
[58] Field of Search ....................... 340/172.5; 444/1

[56] References Cited

UNITED STATES PATENTS 3,508,205 4/1970 Kubie .............................. 340/172.5
3,609,697 9/1971 Blevins ............................ 340/172.5

*Primary Examiner*—Raulfe B. Zache
*Attorney*—Edward R. Hyde, Jr.

[57] ABSTRACT

A security system for a computer provides reliability in operation by limiting access to application and other programs stored in the memory of the computer. The control panel of the computer severely limits access by providing thereon only on-off control, run control, and keyed program load control switches. Thus an operator can only turn on and off the computer and actuate the run control. The possession of a key is required to load the computer with an application program.

9 Claims, 5 Drawing Figures

METHOD AND APPARATUS FOR PROVIDING A SECURITY SYSTEM FOR A COMPUTER

A related patent is U.S. Pat. No. 3,721,813, Mar. 20, 1973 for Analytical Instrument System in the names of Richard D. Condon et al.

An initializing bootstrap program is entered into a predetermined portion of the memory of the computer and places a halt instruction in a preselected storage location in the memory. The actuation of the run control switch addresses the preselected storage location to read out the contents of this location. In the absence of a correctly loaded application program, a halt instruction from the preselected storage location stops the computer as soon as it is started. However the halt instruction is erased when the proper application program is loaded into the computer.

The application program is loaded by actuation of the program load control switch by the proper key. Thus only authorized personnel can load the computer. The keyed program load control switch activates the bootstrap program to read into the memory of the computer a supervisory loader program that in turn supervises the loading of the application program into the memory. The supervisory loader program includes one or more checksums therein that are compared with the application program as it is read. When certain criteria, such as the satisfaction of the checksums occur, the supervisory loader program cancels the halt instruction in the preselected storage location and inserts therein the address of the beginning of the application program. Therefore, when the proper application program is inserted into the memory correctly, the actuation of the run control switch causes the computer to execute the application program.

BACKGROUND OF THE INVENTION

The operation of a computer is controlled by one or more programs stored in the memory of the computer. Such programs may be sent to a computer user's premises on paper or magnetic tape or the like and the programs are read into the computer either by the customer or a representative of the computer manufacturer.

Computers generally include means for providing access to the stored programs to modify them, for example, to conform to changing requirements with passing time. While this facility is a necessary asset in general purpose computers, the possession of this ability to alter a stored program also presents the potential for an accidental or unauthorized interference with the program. Since a program is carefully prepared in accordance with a particular scheme of computation or algorithm, such interferences can cause not only costly waste of time and labor to correct, but the chance that erroneous outputs would go undetected.

Operators of general purpose computers are generally skillful at detecting and correcting errors introduced into a stored program. However, operators of special purpose or dedicated computers may not be so skillful. Such dedicated computers may for example be coupled to operate on data received from an analytical measuring instrument. The operator of an analytical instrument is likely to be skillful in his analytical field and in the use of an instrument, but not in the use of computers utilized in support of the analytical instrument. Consequently it is desirable to prevent the inadvertent or deliberate interference with the stored program in such dedicated computers.

SUMMARY OF THE INVENTION

A security system for a computer attains operational reliability by limiting access to the computer by providing a control panel that includes substantially only on-off controls, a run control, and a keyed program load control. The run control is coupled to read out the contents of a preselected storage location in the memory of the computer. Means are provided for initially storing a halt instruction in the said preselected storage location to prevent the operation of said computer when the run control is actuated. The actuation of the keyed program load control initiates the loading of an application program which when properly loaded causes the halt instruction in the preselected storage location to be overwritten by the address of the beginning of the application program. The run control then activates the application program to operate the computer accordingly.

GENERAL DESCRIPTION

Figure 1:
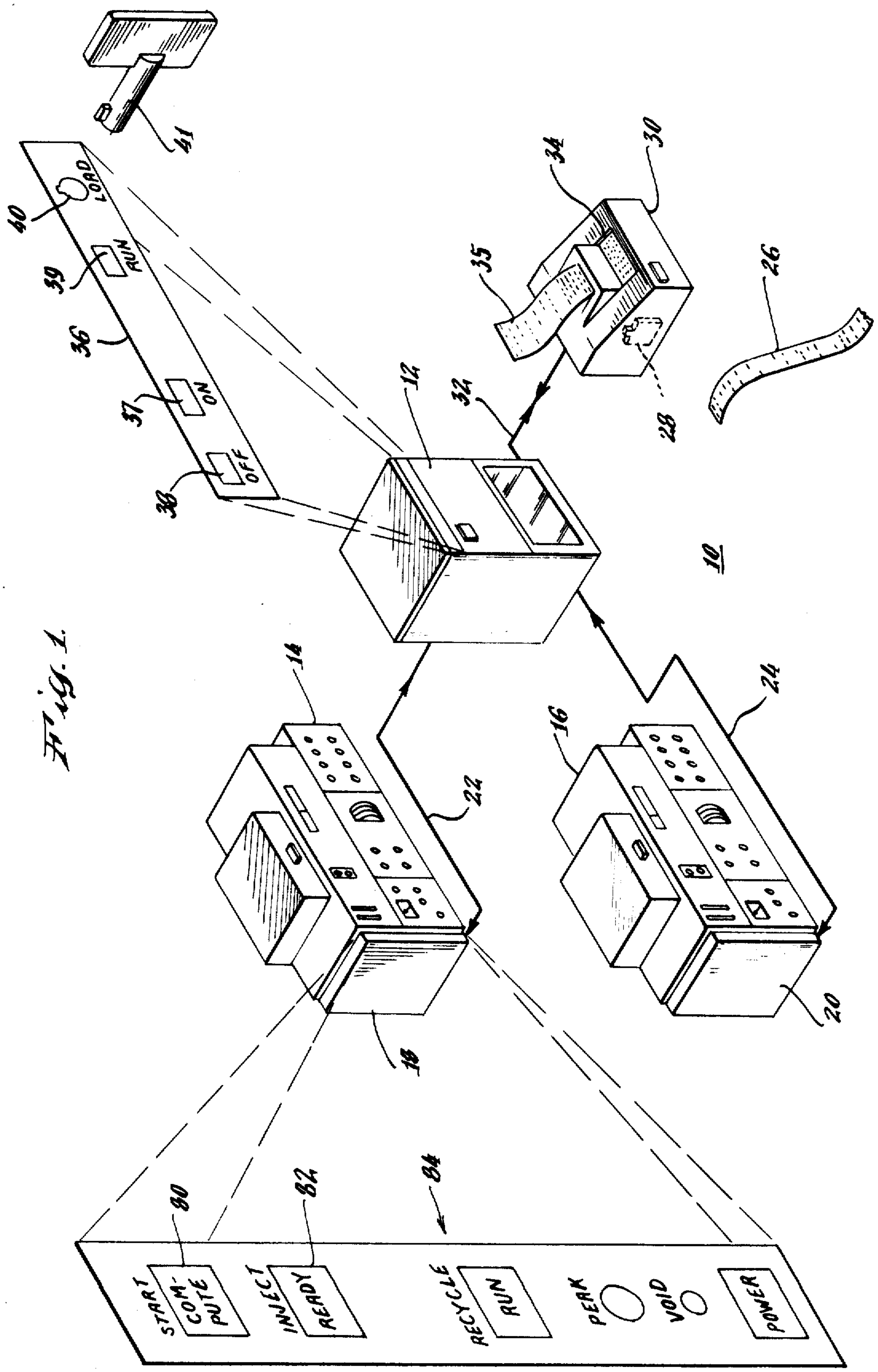
FIG. 1 is a perspective view of an analytical computing system embodying the invention, with the control panels thereof shown in exploded view.

An analytical computing system 10 shown in FIG. 1 includes a computer 12 that embodies the invention. One or more analytical instruments such as gas chromatographs 14 and 16 are each coupled to the computer 12 through interfaces 18 and 20. The gas chromatographs 14 and 16 are identical to each other and the interfaces 18 and 20 are also identical to each other. The interfaces 18 and 20 are coupled to the computer 12 via cables 22 and 24 respectively. The computer 12 is provided with one or more stored programs. Additional programs are carried on tapes 26 which may for example comprise magnetic or punched paper tapes. The tapes are entered into the computer 12 by means of a tape reader 28 that is mounted on a data terminal 30 and coupled to the computer via an input/output cable 32. The data terminal 30 may for example comprise a modified ARS–33 teletype that includes a keyboard 34 for accessing the computer 12 and which provides a printed output report 35 to record the results of the data analyzed in the computer 12.

All of the front panel controls for communicating directly with the programs stored in the memory of the computer 12 have been eliminated with the exception of those controls shown on the exploded view of the control panel 36 shown in FIG. 1. These controls severely limit access to the programs but in turn secure the programs against undesired interferences. These controls are on 37 and off 38 switches, a run control switch 39 and a keyed program load switch 40.

The on and off switches 37 and 38 of course turn the computer 12 on and off. The run control switch 39 reads out and executes the contents of a preselected storage location in the memory of the computer 12. Initially a halt instruction is stored in this preselected location so that actuating the run control 39 merely stops the computer 12. The program load switch 40 when operated by a key 41 loads a supervisory loader program and an application program into the memory of the computer. These programs are provided on the punched paper tape 26 and loaded via cable 32 from the data terminal 30. The keyed program load control 40 may be operated only by authorized personnel who have access to the key 41.

The supervisory program supervises the loading of the application program and when the application program is properly written into the memory of the computer 12, the halt instruction in the preselected storage location in the memory is erased and the beginning address of the application program is inserted therein. Thus, when the run control 39 is subsequently actuated, the computer 12 executes the application program.

Figure 2:
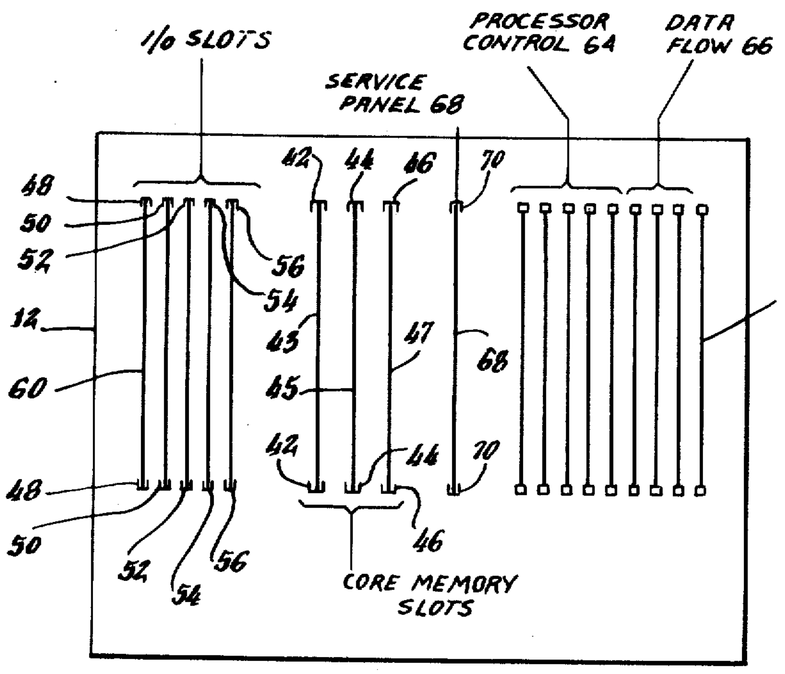
FIG. 2 is a schematic rear view of the computer shown in FIG. 1.

The back of the computer 12 is shown schematically in FIG. 2. The computer 12 can accept up to three memory units or planes of 4,096 (4K) words of 16 bits each that are mounted in core memory slots 42, 44 and 46 respectively. Each of the memory units 43, 45, and 47 comprises a magnetic core stack or plane that contains 65,000 (really 65,536) individual magnetic cores to store the 4K words of 16 bits each. The basic memory unit in the computer 12 in its minimum configuration operates with a single 4K word memory unit in the slots 46. Additional memory units are added in 4K units up to the total of 12K words.

A plurality of input/output boards 60 are mounted in I/O slots 48, 50, 52, 54, and 56. The input/output boards 60 are instrument related and one board can handle up to two gas chromatographs or one data terminal. To expand the system, an additional gas chromatographic channel requires only the addition of an interface similar to interface 18 at the chromatograph and an input/output board 60 in one of the I/O slots. The computer 12 also includes a power supply circuit board 62 as well as processor control printed circuit boards 64 and data flow circuit boards 66. Additional power supply components are mounted below the computer 12. A service panel 68 is mounted in service panel slot 70.

Figure 3:
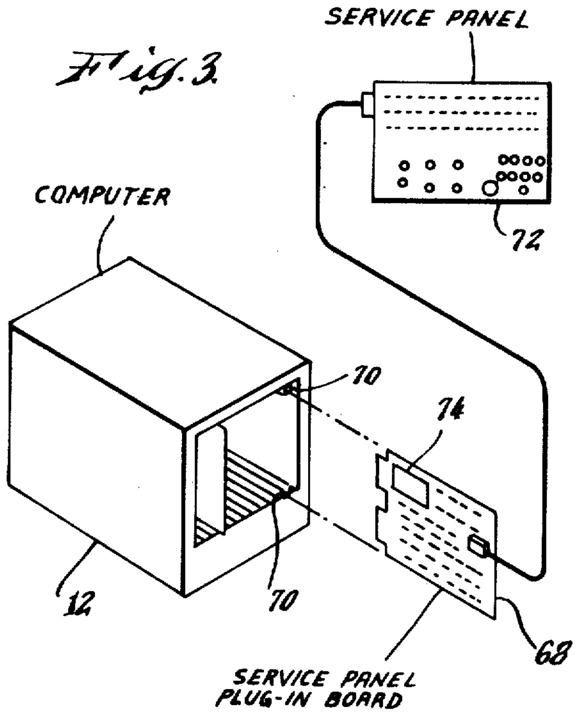
FIG. 3 is a perspective view of a plug-in board to be inserted into the computer of FIG. 1.

There is limited access to the computer 12 since the control panel 36 is designed only to run a stored program in the computer. Consequently provision is made for attaining complete access by means of a service panel. Such a panel is illustrated in FIG. 3. The service panel 72 contains all the controls necessary for a serviceman to maintain the computer 12. The service panel 72 is coupled to the computer 12 by means of a service panel plug-in board 68. The plug-in or pluggable board 68 is inserted into the slots 70 on the back of the computer 12 to connect the various data processing paths to the service panel 72. The board 68 also includes a read-only-memory (ROM) 74 that stores an initializing bootstrap program. The bootstrap program is entered into the memory of the computer 12 by a serviceman and the bootstrap program inserts the halt instruction into the preselected storage location in the memory of the computer 12.

Figure 4:
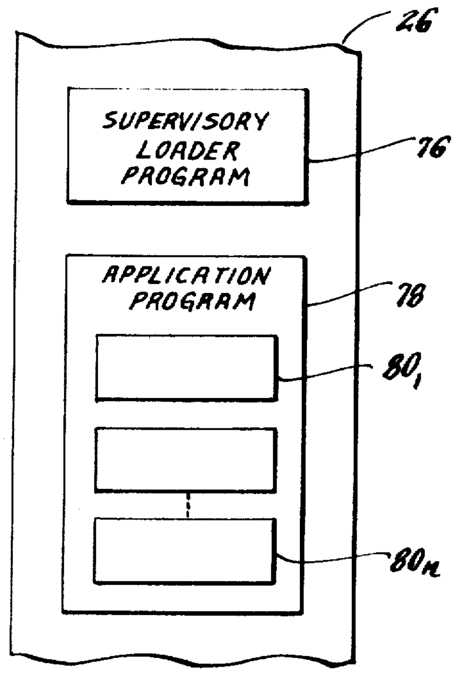
FIG. 4 is a graphical representation of the programs loaded into the computer shown in FIG. 1.

In FIG. 4 there is shown a graphical symbolic representation of the program contained on a tape 26. Initially there appears a supervisory loader program 76. The loader program 76 is read into the computer 12 via the data terminal 30 by actuation of the bootstrap program resident in the memory. The loader program in turn supervises the loading of the application program 78 into the memory. The application program 78 is divided into a plurality of blocks 801 through 80n Each of the blocks contains a predetermined number of program instructions and each block may be preceded by a code symbol S with the exception of the last block, which may contain a code symbol L. The coded symbols may provide checks and the predetermined numbers of instructions provide checksum tests that must be passed by any application program before it can be loaded into the memory of the computer 12.

GENERAL OPERATION

Initially the bootstrap program is transferred from the read only memory 74 on the service panel plug-in board 68 into the memory of the computer 12. The bootstrap program writes a halt instruction in a preselected storage location of the memory. Since an operator of the analytical system 10 does not have a service panel 72 such a transferral is done by the manufacturer's serviceman. It is to be noted that the absence of such a detailed control panel from the computer 12 saves a customer a significant amount of money, as well as prevents undesired interferences with the programs stored in the computer 12.

An authorized person utilizes the key 41 to actuate the program load control switch 40. The program load control 40 activates the bootstrap program to read into the computer 12 the programs 76 and 78 contained on the tape 26. The programs are transferred via the data terminal 30. When the bootstrap program finishes loading in the supervisory loader program, the loader program takes over the loading of the application program. The loader program includes a plurality of checks and checksum tests to insure that the proper application program is loaded. When the application program has been completely loaded, the supervisory loader program erases the halt instruction in the preselected storage location and inserts therein the address of the beginning of the application program. The computer 12 is then ready for operation. A more detailed description of the application program is provided in the U.S. Pat. No. 3,721,813, Mar. 20, 1973.

An operator of the analytical system 10 need only press the on and run control buttons 37 and 39 of the computer control panel 36 when the system 10 is to be operated, as long as the correct application program has been loaded. Thus only a minimum amount of computer knowledge is needed to operate the computer 12 in the analytical system 10.

When the instruments in the system 10 are gas chromatographs, the application program analyzes the data derived from the gas chromatographs 14 and 16 and which are stored temporarily in the memory of the computer 12. The application programs essentially provide the detection of peaks, the time of such detection, and the area of each peak detected. An operator of the analytical system 10 initiates an analysis by pressing a start button 80 on an interface control panel 84. The operator enters certain control parameters via the data terminal 30 for providing the correct printout 35 and then prepares the sample. The sample is injected into the instrument 14 and the inject button 82 notifies the computer 12 that a sample is ready to be analyzed. As a peak is eluted during the sample analysis, the data provided by the interface 18 is transmitted via cable 22 to the computer 12 where the data is analyzed by the application programs stored in the memory of the computer 12. These programs perform all the necessary analyses for determining the constituent components in the sample being tested as well as their concentrations and furthermore prints out a report specifying these components.

DETAILED DESCRIPTION

Figure 5:
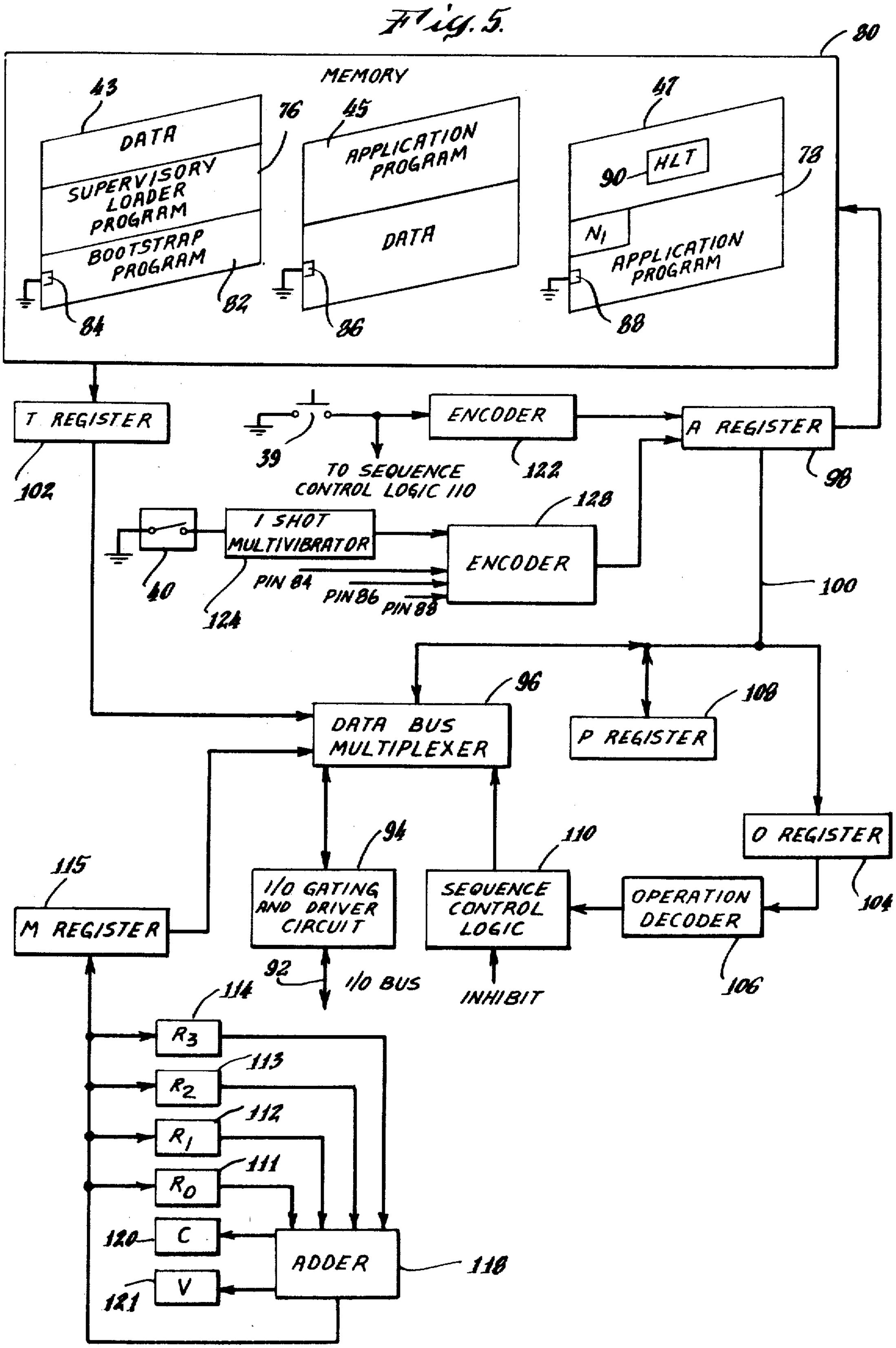
FIG. 5 is a block diagram of the computer shown in FIG. 1.

In FIG. 5 there is shown a schematic block diagram of the central processor unit of the computer 12. The processor unit includes the memory 80 in which the initializing bootstrap program 82 is loaded, for example in the memory unit 43. The bootstrap program 82 is placed in the last or highest numbered storage location in the memory 80. The highest numbered storage locations are derived from grounding pins 84, 86 and 88 because the absence of any of the memory units ungrounds one of these pins, which circumstance is detected. The bootstrap program 82 upon being entered into the memory 80 writes a halt instruction in the preselected storage location 90. The location 90 may for example be the 10th storage location in the memory 80.

The supervisory loader program 76 is written into the memory 80 into storage locations that immediately precede the storage locations that store the bootstrap program 82. The supervisory loader program 76 loads one or more application programs 78 into storage locations immediately after the first N locations in the memory 80. Thus the first storage location of the application program is $N_1$. When the correct application program is entered into the memory 80, the supervisory loader program 76 overwrites the address $N_1$ of the beginning of the application program into the preselected storage location 90. Thus the halt instruction is erased.

Information from input and output (I/O) devices are received via an I/O bus 92 and applied to an I/O gating and driver circuit 94. The I/O gating and driver circuit 94 is coupled to a data bus multiplexer 96. The multiplexer 96 functions to distribute data and instructions to and from the memory 80 from and to the input/output devices as well as to the other units in the processor. Data to be read or entered into the memory 80 is directed to the memory 80 by means of an address register (A register) 98. The bus 100 couples the data from the data bus multiplexer 96. Stored data and instructions read from the memory 80 are coupled via a memory data register or T register 102 to the multiplexer 96, where the information is distributed. An instruction read from the memory 80 is coupled into and temporarily stored in an operation or O register 104 and decoded while therein by means of an operation decoder 106. A program counter or P register 108 is also coupled to the multiplexer 96 via the data bus 100 to keep a running count of the program instruction to be executed.

A sequence control logic circuit 110 functions as a fetch/execute timing control device to sequence the fetching of program instructions from the memory 80 and the execution of these instructions after decoding by the operation decoder 106. Thus during the fetch portion of the memory cycle the A register 98 addresses a particular storage location in the memory and the contents of this location are read out via the T register 102 to the multiplexer 96. The operation code is sequenced to the 0 register 104 where the operation is decoded by the operation decoder 106. During the execute portion of the memory cycle, the arithmetic or other operation is completed.

The arithmetic portion of the processor unit includes a plurality of accumulator registers labelled $R_0$, $R_1$, $R_2$, and $R_3$ and referenced 111–114 respectively. These registers are addressed by means of a subscript *i* and each includes storage for a 16 bit word. The registers $R_2$ and $R_3$ also function as index registers and cooperate with an M register 115 when data from the memory is to be utilized in the arithmetic portion of the processor. All of the registers 111–114 are coupled to an adder circuit 118 to perform the arithmetic operations. Two one-bit registers, a C register 120 and a V register 121 are coupled to the adder 118. The C register 120 stores a carry during the arithmetic addition operation whereas the V register 121 stores an overflow indication. A more detailed description of the processor is contained in the aforementioned U.S. Pat. No. 3,721,813.

The run control switch 39 is coupled to activate an encoder 122 when depressed. The encoder is coupled to place the address of location 10 in the address register 88 and hence read the contents of this location. The run control switch 39 is also coupled to the sequence control logic circuit 110 to initialize the fetch/execute memory cycle. A halt instruction when executed applies an inhibit signal to the sequence control logic 110 to halt the operation of the central processor unit.

The load control switch 40 when closed activates an encoder 128 to apply the address of the last instruction in the bootstrap program 82 to the A register 98. The encoder 128 may, for example, comprise a diode encoder that receives signals from the ground pins 84, 86 and 88 of the memory units 80 denoting the last or highest storage location in the memory 80. The bootstrap program is stored in this portion of the memory. The complete listing of the bootstrap program is shown in Table I below.

In the bootstrap program, Column 1 is merely a sequential listing of the instructions in the program. Column 2 is the address of the storage location, in octal coded form, in which the instruction is stored. Column 3 is a listing of the instructions, in octal coded form, that are stored in binary form in the locations listed in column 2. Column 4 is a listing of the instructions in mnemonic form. Since the mnemonic form is an assembly language developed by the assignee of this application, an explanation of this assembly language follows the bootstrap program listing. Column 5 is an English language description of the various instructions in the bootstrap program.

TABLE I
BOOTSTRAP PROGRAM

| 1 | 2 | 3 | 4 | 5 |
|---|---|---|---|---|
| 1 | 07745 | 174200 Start: | IOFF | ;Disable interrupts immediately |
| 2 | 07746 | 124200 | RTTC O,O | ;Clear out TTY buffer. |
| 3 | 00747 | 140774 | LM HALT | ;R0 and R2 matter. |
| 4 | 07750 | 020010 | ST 0,'10 | ;Block 'run' entry point with HLT. |
| 5 | 07751 | 166377 | IL 0,'377 | ;Prepare left BYTE of (negative) word count. |
| 6 | 07752 | 050744 | A 2, Start-1 | ;Now R2 contains the value 'Start'. |
| 7 | 07753 | 172237 | CLR SZ 3 | ;Set up R3 for accumulating check sum. |
| 8 | 07754 | 170214 Read: | AR 3,0 | ;Add to check sum. |
| 9 | 07755 | 176603 | SL 0,8 | ;Move the right BYTE to be the left BYTE. |
| 10 | 07756 | 120200 Null: | STTR 0 | ;Wait for TTY read buffer to become ready. |
| 11 | 07757 | 150756 | J .-1 | ; |
| 12 | 07760 | 125200 | RTTC 1,0 | ;Read what will be a right BYTE. |
| 13 | 07761 | 170335 | AR SNZ 3,1 | ;Add to check sum. Skip unless it is now zero. |
| 14 | 07762 | 150756 | J NULL | ;Working on leader, which must be nulls. |
| 15 | 07763 | 172004 | OR 1,0 | ;Build a word for storage. |
| 16 | 07764 | 173012 | DR 2,2 | ;Set up the pointer for word storage. |
| 17 | 07765 | 025000 | ST 1,0(2) | ;Put the word in memory using the pointer. |
| 18 | 07766 | 120200 | STTR 0 | ;Wait for TTY read buffer to become ready. |
| 19 | 07767 | 150766 | J .-1 | ; |
| 20 | 07770 | 124200 | RTTC 0,0 | ;Read what will be a left BYTE. |
| 21 | 07771 | 160744 | ISZ START-1 | ;Increment the (negative) word count. Test it. |
| 22 | 07772 | 150754 | J READ | ;Go back around for another word to store. |
| 23 | 07773 | 170235 | AR SZ 3,1 | ;Last word has been stored. Test check sum. |
| 24 | 07774 | 175000 Halt: | HLT | ;This stops action if check sum is not ok. |
| 25 | 07775 | 151001 | J 1(2) | ;If ok, give control to program just loaded. |
| 26 | 07776 | 177745 | START-END-1 | ;Used in setting up R2 as storage pointer. |
| 27 | 07777 | 154744 End: | JS START-1 | ;Start key starts operation here. |
| 28 | | | END | ; |

DESCRIPTION OF EACH STORAGE REFERENCE INSTRUCTION

OPERATION LOAD (mnemonic L)

The content of the specified R-register ($R_i$) is replaced by the content of the effective address. The content of the effective address, C & V remain the same.

OPERATION STORE (Mnemonic ST)

The content of the effective address is replaced by the content of the specified R-register ($R_i$). The content of the specified R-register ($R_i$), C & V remain the same.

OPERATION ADD (mnemonic A)

The content of the effective address is added to the content of the specified R-register ($R_i$) in two's complement arithmetic. The sum replaces the content of the specified R-register ($R_i$). The content of the effective address remains the same. All sixteen bits of both operands participate in the addition. If a carry occurs out of the sign-bit position (0) of the adder, the carry register (C) is set to one, otherwise the carry (C) is set to zero. If carries out of the sign-bit position (0) and the high-order numeric bit position (1) disagree, an overflow occurs and the V bit is set to one, otherwise, the V bit is set to zero. Overflow is accompanied by a sign change.

OPERATION SUBTRACT (mnemonic S)

The content of the effective address is subtracted from the content of the specified R-register ($R_i$) in two's complement arithmetic. The difference replaces the content of the specified R-register ($R_i$). The content of the effective address remains the same. All 16 bits of both operands participate in subtraction. The subtraction is accomplished by adding the two's complement of the content of the effective address to the content of the specified R-register. If a carry occurs out of the signbit position (0) of the adder the carry register (C) is set to one otherwise the carry (C) is set to zero. If carries out of the sign-bit position (0) and the high order numeric bit position (1) disagree, an overflow occurs and the V bit is set to one, otherwise, the V bit is set to zero. Overflow is accompanied by a sign change.

OPERATION COMPARE AND SKIP IF EQUAL (mnemonic CSE)

The content of the effective address is subtracted from the content of the specified R-register ($R_i$) in two's complement arithmetic. If the difference is equal to zero, the content of the program counter (P) is incremented by 1 and the next sequential instruction is thereby skipped. If the difference is not equal to zero, the program counter (P) is not incremented and thus the program proceeds to the next sequential instruction. Neither the content of the specified R-register ($R_i$) nor the carry (C) nor (V) is changed by this instruction.

OPERATION LOAD MULTIPLE (mnemonic LM)

The content of R-register 0 ($R_0$) is replaced by the content of the effective address. The storage address is then incremented by 1 and the content of the new effective address replaces the content of register $R_1$. The process continues sequentially for $R_2$ and $R_3$. Finally the carry (C) and the overflow (V) are replaced by bits 0 and 1 respectively of the content of the last effective address in the sequence. The content of the five storage locations are left unchanged.

OPERATION STORE MULTIPLE (mnemonic STM)

The content of the effective address is replaced by the content of register $R_0$. The storage address is incremented by 1 and the content of register $R_1$ replaces the new effective address. The operation continues sequentially through $R_2$ and $R_3$. Finally, the carry (C) and the overflow (V) replace bits 0 and 1 respectively of the content of the final effective address. Bits (2) through (15) of the content of the final effective address are set to zero. The contents of the four R-registers, the carry and overflow are left unchanged.

OPERATION: INCREMENT AND SKIP IF ZERO (mnemonic ISZ)

The content of the effective address is incremented by 1 and the resultant value replaces the original value in the location specified by the effective address. If the resultant value of the content of the effective address equals 0, the content of the program counter (P) is incremented by 1 and the next sequential instruction is thereby skipped. If after incrementation the resultant value of the content of the effective address does not equal 0, the program counter (P) is not incremented, and thus the program proceeds to the next sequential instruction. The contents of the 4 R-registers and the carry register and the overflow are not changed by this instruction.

OPERATION JUMP (mnemonic J)

The effective address replaces the content of the program counter (P). The next instruction is fetched from the location specified by the program counter. The R-registers, the carry (C) and the overflow (V) remain unchanged. Testing an interrupt condition following the Jump operation is suppressed even if the Interrupt Status is enabled; therefore, an interrupt will never follow directly after a Jump instruction, but will follow after completion of the instruction following the Jump unless it too is a Jump, Jump to Subroutine or Interrupt Status On instruction.

OPERATION: JUMP TO SUBROUTINE (mnemonic JS)

The value of the content of the program counter, which has been incremented, replaces the content of the effective address. Thus, the effective address contains the address of the next sequential instruction after JS. Then the effective address is incremented by one and replaces the content of the program counter (P). The next instruction is then fetched from the location specified by the program counter. The R-registers, the carry (C) and the overflow (V) remain unchanged. Testing an interrupt condition following the Jump to Subroutine operation is suppressed even if the Interrupt Status is enabled; therefore, an interrupt will never follow directly after a Jump to Subroutine instruction, but will follow after completion of the instruction following the Jump to Subroutine unless it too is a Jump, Jump to Subroutine or Interrupt Status On instruction.

OPERATION IMMEDIATE LOAD (mnemonic IL)

Bits 8 through 15 of the content of the specified R-register ($R_i$) are replaced by bits 8 through 15 of the instruction, the immediate operand. Bits 0 through 7 of the content of $R_i$ are set to zero. The carry (C) and the overflow (V) are left unchanged.

OPERATION IMMEDIATE COMPARE & SKIP IF EQUAL (nmemonic ICSE)

Bits 7 through 15 of the instruction are extended by eight high order zeros to form a 16 bit operand. This operand is subtracted from the content of the specified R-register ($R_i$) in two's complement arithmetic. If the difference is equal to zero, the content of the program counter (P) is incremented by 1 and next sequential instruction is thereby skipped. If the difference is not equal to zero, the program counter (P) is not incremented and thus the program proceeds to the next sequential instruction. Neither the content of the specified R-register ($R_i$) nor the carry (C) nor (V) is changed by this instruction.

MNEMONICS

Sz — Skip if Zero
SZP — Skip if Zero or Plus
SC — Skip if Carry (C=1)
SNV — Skip if Not overflow (V=0)
SNZ — Skip if Not zero
SM — Skip if Minus
SNC — Skip if Not Carry (C=0)

OPERATION MOVE REGISTER (mnemonic MVR)

The content of the source register ($R_iS$) replaces the content of the destination register ($R_iD$). The content of the carry (C) and overflow (V) remain unchanged. NOTE: The specification ($R_iS$) may be set equal to ($R_iD$). This is, in effect, a "No OP." However, the skip mnemonic may be applied to the specified operand.

OPERATION ADD REGISTER (mnemonic AR)

The content of the source register ($R_iS$) is added to the content of the destination register ($R_iD$). The sum replaces the content of the destination register ($R_iD$). All 16 bits of both operands participate in the addition. If a carry occurs out of the sign-bit position (0) of the adder, the carry (C) register is set to (1) otherwise the carry (C) is set to (0). If carries out of the sign-bit position (0) and the high order numeric bit position (1) disagree, an overflow occurs and the V bit is set to one, otherwise the V bit is set to zero. Overflow is accompanied by a sign change.

OPERATION ADD WITH CARRY REGISTER (mnemonic ACR)

The content of the source register ($R_iS$) is added to the content of the destination register ($R_iD$). The sum replaces the content of the destination register ($R_iD$). All 16 bits of both operands participate in the addition, as well as the initial value of the carry (C) which is introduced into the low order adder position (15) as an input carry. If a carry occurs out of the sign-bit position (0), the carry (C) register is set to one, otherwise the carry (C) is set to zero. If carries out of the sign-bit position (0) and the high order numeric bit position (1) disagree, an overflow occurs and the V bit is set to one, otherwise, the V bit is set to zero. Overflow is accompanied by a sign change.

OPERATION SUBTRACT REGISTER (mnemonic SR)

The content of the source register ($R_iS$) is subtracted from the content of the destination register ($R_iD$). The difference replaces the content of the destination register ($R_iD$). All 16 bits of both operands participate in the subtraction. The subtraction is accomplished by adding the two's complement of the content of the source register ($R_iS$) to the content of the destination register ($R_iD$). If a carry occurs out of the sign-bit position (0) the adder, the carry (C) is set to one, otherwise, the carry (C) is set to (0). If carries out of the sign-bit position (0) and the high order numeric bit position (1) disagree, an overflow occurs and the V bit is set to one, otherwise, the V bit is set to zero. Overflow is accompanied by a sign change.

OPERATION SUBTRACT WITH CARRY REGISTER (mnemonic SCR)

The content of the source register ($R_iS$) is subtracted from the content of the destination register ($R_iD$) and the difference replaces the content of the destination register ($R_iD$). All 16 bits of both operands participate in the subtract, as well as the initial value of the carry (C) which is introduced into the low order adder position (15) as an input carry. The subtraction is accomplished by adding the complement of the content of the source register ($R_iS$) to the content of the destination register ($R_iD$) together with the carry (C) input as described above. If a carry occurs out of the sign-bit position (0) of the adder the carry (C) is set to one, otherwise the carry (C) is set to zero. If carries out of the sign-bit position (0) and the high order numeric bit position (1) disagree, an overflow occurs and the V bit is set to one. Otherwise the V bit is set to zero. Overflow is accompanied by a sign change.

OPERATION ARITHMETIC SKIP IF (mnemonic ASIF)

The signed content of the source register ($R_iS$) is subtracted algebraically in two's complement arithmetic from the signed content of the destination register ($R_iD$). The contents of ($R_iS$), ($R_iD$), (C) & (V) remain unchanged. The skip is under control of the "M" field which is interpreted differently for "Skip If" types only.

OPERATION LOGICAL SKIP IF (mnemonic LSIF)

The unsigned content of the source register ($R_iS$) is subtracted algebraically in two's complement arithmetic from the unsigned content of the destination register ($R_iD$). The contents of ($R_iS$), ($R_iD$), (C), & (V) remain unchanged. The skip is under control of the "M" field which is interpreted differently for the "Skip If" types only.

OPERATION AND (mnemonic AND)

The content of the destination register ($R_iD$) is replaced with the logical product (AND) of the bits of the specified destination register ($R_iD$) and the specified source register ($R_iS$). The contents of the carry and overflow remain unchanged. Operands are treated as unstructured logical quantities, and the connective "AND" is applied bit by bit. The bit position in the result is set to (1) if both of the corresponding bit positions contain a one; otherwise the result bit is set to zero.

OPERATION OR (mnemonic OR)

The content of the destination register ($R_iD$) is replaced with the logical sum (OR) of the bits of the specified destination register ($R_iD$) and the specified source register ($R_iS$). The contents of the carry and overflow remain unchanged. Operands are treated as unstructured logical quantities, and the connective inclusive "OR" is applied bit by bit. A bit position in the result is set to (1) if the corresponding bit position of either or of both operands contain a (1); otherwise, the result bit is set to zero.

OPERATION EXCLUSIVE OR (mnemonic XOR)

The content of the destination register ($R_iD$) is replaced with the modulo-two sum (Exclusive OR) of the bits of the specified destination register ($R_iD$) and specified source register ($R_iS$). The content of the carry and overflow remain unchanged. Operands are treated as unstructed logical quantities and the Exclusive OR is applied bit by bit. A bit position in the result is set to (1) if the corresponding bit positions in the two operands are unlike; otherwise, the result bit is set to zero.

OPERATION NOT (mnemonic NOT)

The content of the destination register ($R_iD$) is replaced with the logical complement (NOT) of the bits of the specified source register ($R_iS$). The contents of the carry and overflow remain unchanged. The operand is treated as an unstructured logical quantity, the connective (NOT) is applied bit by bit. The bit position in the result is set to (1) if the corresponding bit position of the source contains a (0); otherwise, the result bit is set to zero.

OPERATION INCREMENT REGISTER (mnemonic IR)

The value in the content of the source register ($R_iS$) is increased by one. The result replaces the content of the destination register ($R_iD$). If a carry occurs out of the sign-bit (0) of the adder the carry (C) is set to (1), otherwise, the carry (C) is set to (0). If carries out of the sign-bit position (0) and the high order numeric bit position (1) disagree, an overflow occurs and the V bit is set to one, otherwise the V bit is set to zero. Overflow is accompanied by a sign change.

OPERATION DECREMENT REGISTER (mnemonic DR)

The two's complement value of the content of the source register ($R_iS$) is reduced by one. The result replaces the content of the destination register ($R_iD$). If a carry occurs out of the sign-bit position (0) of the adder, the carry (C) register is set to (1), otherwise, the carry (C) is set to (0). If carries out of the sign-bit position (0) and the high order numeric bit position (1) disagree, an overflow occurs and the V bit is set to one, otherwise the V bit is set to zero. Overflow is accompanied by a sign change.

OPERATION SHIFT RIGHT ARITHMETIC (mnemonic SRA)

The content of the specified register ($R_i$) is shifted right by an amount specified by the number field (N). The value of the sign, bit position (0), remains unchanged and also is propagated to the right; bit (0) 27 bit (1), bit (1) bit (2), etc. The value of the low order position (15) is shifted into the carry (C), while bits shifted out of the carry (C) are lost.

OPERATION SHIFT RIGHT LOGICAL (mnemonic SRL)

The content of the specified register ($R_i$) is shifted right by an amount specified by the number field (N). Zeros are introduced to the high order position [bit (0)] of the register and are propagated to the right; zero bit (0) bit(0) bit (1), bit (1) bit (2), etc. The value of the low order position (15) is shifted into the carry (C), while bits shifted out of the carry (C) are lost.

OPERATION SHIFT RIGHT WITH CARRY (mnemonic SRC)

The content of the specified register ($R_i$) is shifted right by an amount specified by the number field (N). The initial value of the carry ($C_I$) is introduced to the high order position (0) of the shifter and is propagated to the right; $C_I$ bit (0), bit (0) bit (1), bit (1) bit (2), etc. The value of the low order position (15) is shifted into the final value of the carry ($C_F$) while bits shifted out of the carry (C), other than the initial value ($C_I$), are lost. In the case of shifts of magnitude greater than one, subsequent shifts beyond the first shift introduce zeros to bit (0).

OPERATION SHIFT LEFT (mnemonic SL)

The content of the specified register ($R_i$) is shifted left by an amount given by number field (N). Zeros are introduced into the low order position (15) of the shifter and are propagated to the left; Zero bit (15), bit (15 bit (14), bit (14) bit (13), etc. The value of the high order position (0) is shifted into the carry (C), while bits shifted out of the carry (C) are lost. If any bits are shifted out of bit (1) which are not equal to bit (0) the overflow (V) is set to one, otherwise the overflow is set to zero.

OPERATION SHIFT LEFT WITH CARRY (mnemonic SLC)

The content of the specified register ($R_i$) is shifted left by an amount given by number field (N). The initial value of the carry ($C_I$) is introduced to the lower order position (15) of the shifter and is propagated to the left; $C_I$ bit (15), bit (15) bit (14) bit (14) bit (13), etc. The value of the high order position (0) is shifted into the final value into the carry ($C_F$) while bits shifted out of the carry (C), other than the initial value ($C_I$) are lost. If any bits are shifted out of bit (1) which are not equal to bit (0) the overflow (V) is set to one, otherwise the overflow is set to zero. In the case of shifts of magnitude greater than one, subsequent shifts beyond the first shift introduces zeros to bit (0).

OPERATION ROTATE RIGHT (mnemonic RR)

The content of the specified register ($R_i$) is rotated right by an amount given by the number field (N). Bits shifted out of the low order position (15) are introduced to the high order position (0) of the shifter and are propagated to the right. Bit (15) bit (0), bit (0) 7 bit (1), bit (1) bit (2), etc. At the same time bits shifted out of the low order position (15) are also shifted into the carry (C) while bits shifted out of the carry (C) are lost.

OPERATION INTERRUPT STATUS ON (mnemonic ION)

This command turns "ON" the Interrupt Status and permits the Processor to respond to an external interrupt request. Testing an interrupt condition following the Interrupt Status on instruction is suppressed even if the Interrupt Status enabled; therefore, an interrupt will never follow directly after an Interrupt Status On Instruction, but will follow after completion of the instruction following the Ion unless it too is a Jump, Jump to Subroutine or Interrupt Status On instruction.

OPERATION INTERRUPT STATUS OFF (DISABLE) (mnemonic IOFF)

The instruction turns the Interrupt Status "OFF" and disables the interrupt mechanism thus preventing the interruption of the Processor program by external requests.

OPERATION "C" ON (mnemonic CON)

The carry register "C" is set equal to one. The V & R registers remain unchanged.

OPERATION "C" OFF (mnemonic COFF)

The carry register "C" is set equal to zero. The V & R registers remain unchanged.

OPERATION HALT (mnemonic HLT)

This instruction, upon completion, causes the Processor to enter HALT STATUS. The Processor is stopped at a point between instructions. Neither the addressable registers nor memory will be changed. The Processor may be restarted at the next sequential instruction by depression of the "GO" button on the optional Service Panel. Also, the Processor may be restarted by depression of the "INITIALIZE" button on the Processor Control Panel. Finally, the loading of a new program may be initiated from HALT status by turning the "Load Key Switch" on the Processor Control Panel. The HALT instruction is intended primarily for use as a diagnostic and service aid.

OPERATION

The security system protects the computer 12 from being operated improperly. The initial bootstrap program 82 stores a halt instruction in the storage location 90 of the memory 80. The depression of the run button 39 causes the encoder 122 to place the address of the storage location 90 in the address register 98. Consequently the contents of this storage location 90 are read out and decoded by the operation decoder 106. If the halt instruction is still resident in the storage location 90, then an inhibit signal is applied to inhibit the fetch/execute memory cycle in the sequence control logic 110. The computer 12 therefore stops operating.

When an authorized operator obtains a key 41 and places a paper tape 26 containing the supervisory loader program 76 and application program 78 in the paper tape reader 28, the computer 12 is ready for loading. The activation of the load program switch 40 causes the encoder 128 to apply the address of the last or highest storage location of the memory 80 to the address register 80. As shown in the bootstrap program in Table 1, this address contains an instruction that jumps the operation to the beginning of the program and the teletype signals are read into the memory 80. Each instruction in the supervisory loader program 76 is entered into the memory 80 successively above the bootstrap program 82. When the entire supervisory loader program 76 has been loaded into the memory, this is indicated and the application program 78 is loaded under the supervision of the loader program 76. The application program 78 as shown in FIG. 4 is divided into a series of blocks $80_I$–$80_n$. The supervisory loader program 76 includes a plurality of checksums. As each block of programming instruction is read into the computer 12, a count is made of the number of instructions in the block and periodical comparisons with the checksums are made. Such checksums, when satisfied, cause the reading to continue. When any checksum is not satisfied, the computer 12 stops immediately and only reloading is possible.

When the entire supervisory program is loaded into the memory 80 with all of the checksum conditions satisfied, then the supervisory loader program 76 causes the halt instruction to be erased from the location 90 in the memory 80. There is written into the storage location 90 the address $N_1$ of the first instruction of the application program 78. Consequently when an operator now depresses the run button 39, the computer 12 executes the application program 78.

Thus a security system is provided for a computer that limits access to the correct programs inserted into the computer. The security system also prevents improper programs from being entered into the computer. Thus the computer can be designed to be dedicated to performing a specific purpose task in the most efficient manner with the knowledge that tampering with the programs that perform this task is extremely difficult. This design purpose produces an inexpensive but extremely efficient machine that can be operated reliably by a person with little knowledge of programs or computers.

It is also to be noted that in addition to providing security from interference by operators of the system 10, the system 10 also includes security protection from environmental interference. Thus the alternating current power input line is filtered and a low power situation is sensed to protect the operating reliability of the system 10. Furthermore ground loop currents are avoided by separately grounding the computer 10 and gas chromatograph units 14 and 16. Additionally the interconnecting cables between the gas chromatograph units 14 and 16 and the computer 12, that is the cables 22 and 24 are shielded. Similarly the electrical lines connecting the run switch and load control switch are also filtered to suppress noise.

What is claimed is:

1. A security system for a computer to obtain reliability in operation by limiting access to application and other programs stored in a plurality of storage locations in a memory in said computer, comprising in combination a control panel for said computer having positioned thereon on-off controls and a run switch control for respectively turning said computer on and off and for running said computer, said run switch being coupled to read out the contents of a preselected storage location in said memory, means for initially storing a halt instruction in said preselected location prior to storing said application program in said memory to prevent the operation of said computer when said run switch is operated, and means for erasing said halt instruction from said preselected location when said application program is properly read into said memory.

4. The method of providing operational security for a computer by limiting access to programs stored in the memory of the computer comprising the steps of:

loading into said memory an initializing bootstrap program that includes a halt instruction that is loaded into a preselected storage location in said memory to halt the operation of said computer when read and executed, providing a run control that, when actuated, reads out and executes the contents of said preselected storage location, and overwriting into said preselected storage location the beginning address of the portion of said memory into which an application program is written when said application program passes selected tests in order to erase said halt instruction to cause said computer to execute said application program when said run control is actuated.

5. The method as claimed in claim 4 that further includes the step of:

providing a keyed load control that activates said bootstrap program to load a supervisory loading program into said memory.

6. The method as claimed in claim 5 that further includes the step of:

loading an application program into said memory under the supervision of said supervisory loading program.

7. The method as claimed in claim 6 that further includes the step of:

dividing said application program into a series of blocks of program instructions with said blocks being of known length.

8. The method as claimed in claim 7 that further includes the step of:

providing checksums in said supervisory loading program to compare with the lengths of said blocks in said application program to provide checksum tests for loading the proper application program.

9. The method as claimed in claim 8 that further includes the step of:

utilizing said checksum tests to initiate the overwriting into said preselected storage location so as to erase said halt instruction.

* * * * *